(12) United States Patent
Butler et al.

(10) Patent No.: US 6,922,656 B2
(45) Date of Patent: Jul. 26, 2005

(54) METHOD AND SYSTEM OF IDENTIFYING A PROBLEM PRONE PART

(75) Inventors: Jeffry A. Butler, Aurora, IL (US); Rodger L. Moring, Bristol, IL (US); David N. Schwartz, Plano, IL (US); Jeffrey A. Stokowski, Aurora, IL (US)

(73) Assignee: Caterpillar Inc, Peoria, IL (US)

(*) Notice: Subject to any disclaimer, the term of this patent is extended or adjusted under 35 U.S.C. 154(b) by 74 days.

(21) Appl. No.: 10/125,671

(22) Filed: Apr. 18, 2002

(65) Prior Publication Data

US 2003/0200055 A1 Oct. 23, 2003

(51) Int. Cl.[7] .............................................. G06F 15/00
(52) U.S. Cl. ........................ 702/183; 702/59; 702/182; 702/185
(58) Field of Search ...................... 702/58, 59, 119–123, 702/126, 179–187, 196, 198, FOR 135, FOR 139, FOR 162, FOR 171; 714/2, 5, 9, 25, 26, 31, 37, 47, 48, 49, 3, 4; 717/100–104; 705/7, 11, 400, 29; 700/100, 116

(56) References Cited

U.S. PATENT DOCUMENTS

| | | | | |
|---|---|---|---|---|
| 4,750,131 A | * | 6/1988 | Martinez ..................... 700/206 |
| 5,442,545 A | * | 8/1995 | Matsui et al. .................. 705/29 |
| 5,596,712 A | | 1/1997 | Tsuyama et al. |
| 5,822,218 A | * | 10/1998 | Moosa et al. ................... 716/4 |
| 6,014,658 A | | 1/2000 | Pretz |
| 6,249,755 B1 | | 6/2001 | Yemini et al. |
| 6,525,543 B1 | * | 2/2003 | Roberts et al. ............. 324/522 |
| 2002/0072878 A1 | * | 6/2002 | Kanehira et al. ........... 702/183 |
| 2002/0078403 A1 | * | 6/2002 | Gullo et al. ................... 714/37 |
| 2002/0099578 A1 | * | 7/2002 | Eicher et al. ................... 705/7 |
| 2002/0099579 A1 | * | 7/2002 | Stowell et al. ................. 705/7 |
| 2002/0099580 A1 | * | 7/2002 | Eicher et al. ................... 705/7 |
| 2002/0099598 A1 | * | 7/2002 | Eicher et al. ................. 705/11 |
| 2003/0033170 A1 | * | 2/2003 | Bhatt et al. ..................... 705/4 |
| 2003/0033260 A1 | * | 2/2003 | Yashiro et al. .............. 705/400 |
| 2003/0101019 A1 | * | 5/2003 | Klausner et al. ............ 702/182 |
| 2003/0110248 A1 | * | 6/2003 | Ritche ........................ 709/224 |

* cited by examiner

*Primary Examiner*—Carol S. W. Tsai

(57) ABSTRACT

The present invention includes a method and system of identifying parts prone to problems. The method includes the steps of establishing a problem threshold, establishing a part type with a problem, determining a problem level with the part type in response to the part type problem level, comparing the problem level with said problem threshold, establishing a production life of the part type, determining if the part type is within a threshold of the production life, identifying the part type as the problem prone part in response to the comparison and the production life determination.

23 Claims, 5 Drawing Sheets

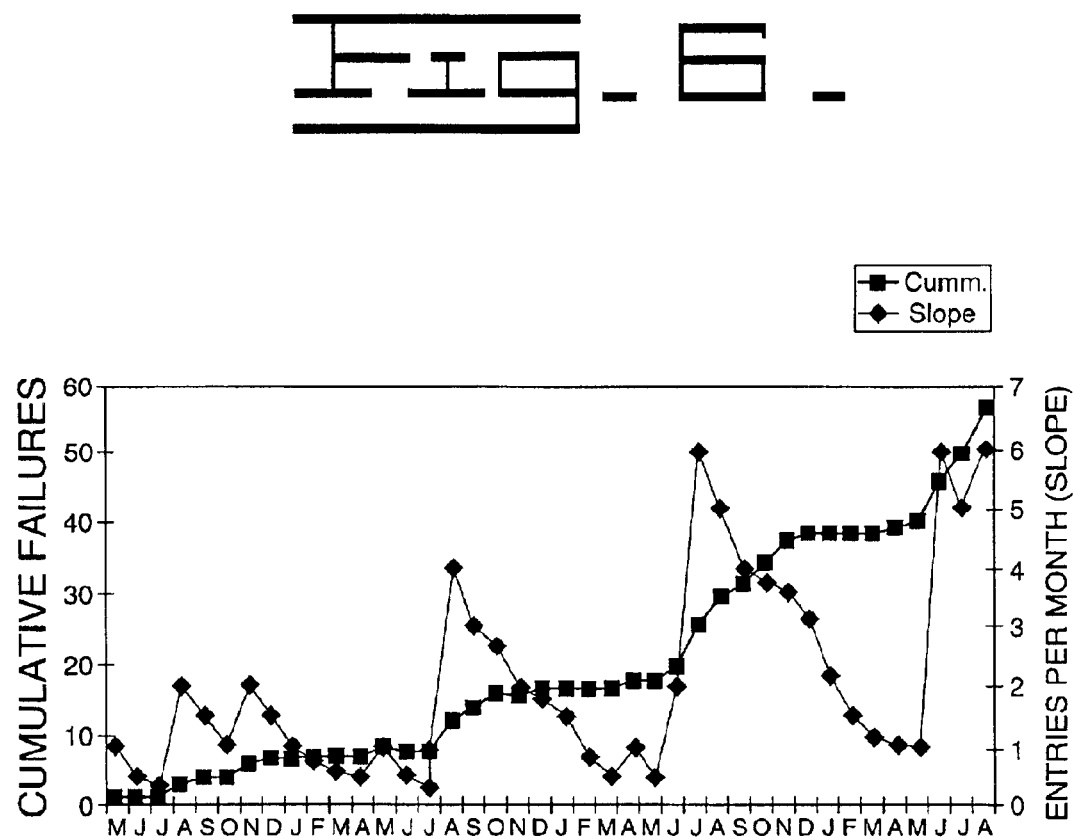
Fig_6_

METHOD AND SYSTEM OF IDENTIFYING A PROBLEM PRONE PART

TECHNICAL FIELD

This invention relates generally to a method and system of identifying part problems, and more particularly to a method and system of determining problem prone parts.

BACKGROUND

Reliability is an important issue for any company involved in such activities as manufacturing, assembling, or selling parts, assemblies, or products. A part, assembly, or product having a low reliability may have high warranty claims or customer dissatisfaction. The longer the problem goes unnoticed or without corrective action, the higher the number or cost of warranty claims or the greater the customer dissatisfaction.

Previous problem tracking techniques have looked at claims or cost associated with high warranty parts, and/or high frequency of failure parts. Using any of these techniques separately can allow moderate frequency and moderate warranty problems to escape early detection. In addition, newly produced parts having high frequency of failure or high warranty problems can be shielded from early detection due to the relatively small population of recently produced machines with the problem part.

Previous tracking techniques may have only looked at a part relative to a particular product. If the part is used across multiple products, the problems may take longer to detect because the magnitude of the problem may not be recognized when analyzing the reliability of the part as it relates only to a single product.

The present invention is directed to overcoming one or more of the problems set forth above.

SUMMARY OF INVENTION

In one aspect of the present invention, a method of identifying a problem prone part type is disclosed. The method includes the steps of establishing a problem threshold, establishing a part type with a problem, determining a problem level with the part type, comparing the problem level with the problem threshold, establishing a production life of the part type, determining if the part type is within a threshold of the production life and, identifying the part type as a problem prone part in response to the comparison and production life determination.

In another aspect of the present invention, a system is configured to identify a problem prone part. The system comprises an interface configured to receive information associated with a part type. A repository is configured to store the part type information, a repository configured to store the part type information; and a controller configured to establish a problem with a part in response to the information, establish a problem threshold, determine a problem level of the part type over a time period, compare the problem level with the problem threshold, and identify a problem with a part in response to the comparison.

In another aspect of the present invention, a method of identifying a problem prone part type is disclosed. The method includes the steps of establishing a parts watch threshold, establishing a problem threshold, establishing a first time period, establishing a part watch time period, establishing a part type with a problem, determining a problem level with the part type during the first time period, establishing a production life of the part type, establishing a parts watch in response to the problem level during the first time period exceeding the part watch threshold, and the part type being within the threshold of the production life, determining a problem level with the part type during the parts watch time period, and identifying the part type as the problem prone part in response to the parts watch problem level exceeding the problem threshold.

BRIEF DESCRIPTION OF THE DRAWINGS

FIG. 6 is an illustration one embodiment of a plot of average number of reports as described above plotted over reporting periods.

DETAILED DESCRIPTION

The present invention includes a method and system configured to identify a problem prone part. The part may have been developed in a manufacturing process and used either as a stand-alone part or as a component on a piece of equipment or assembly. In one embodiment, the part may be an assembly having other parts associated with it. A manufacturer may use the part internally, (e.g. for its own use) or externally (e.g. sell to a customer as a standalone part, or portion of a product, or assembly). In addition, in one embodiment, the part may have been purchased from another company, either as a standalone part, or as a portion of a product or assembly.

Figure 1:
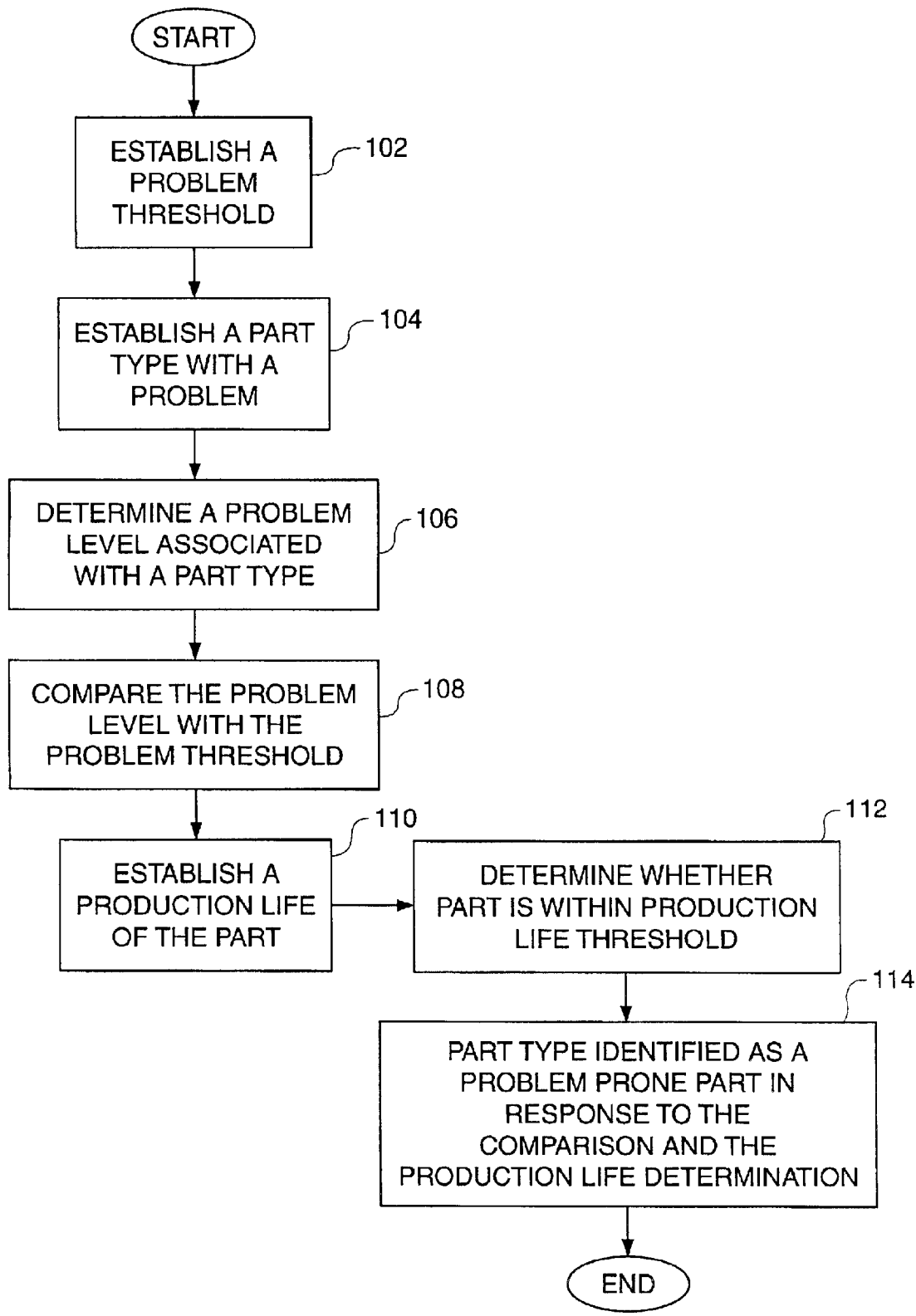
FIG. 1 is an illustration of one embodiment of a method of identifying a problem prone part.

FIG. 1 illustrates one embodiment of a method of identifying a problem prone part. In a first control block 102, a problem threshold is established. The problem threshold is a threshold indicative of when a part type may be having a problem. The problem threshold may be expressed in terms of a part characteristic. The part characteristic may include a cost characteristic, a failure characteristic, and/or a frequency characteristic. For example, the part characteristic may be a number of part failures that may occur, a rate of failure of the parts (or failure frequency), an operational hours before failure, a cost associated with the part (which may include labor cost, warranty cost etc.), a rate of cost associated with the part, a cost of the product associated with the part. The part characteristic may be expressed as a cost per month, cost per failure, or cost per hour of operation. The problem threshold may be expressed in a combination of the above expressions. The problem threshold may be a broad threshold that applies to all parts or may be part specific. In addition, the problem threshold may have an associated time period. For example, the problem threshold may include the problems that occurred over the last year.

In a second control block 104 a particular part with a problem is established. The part type with a problem may be established in response to a dealer claim, warranty claim, service report or other claim or report. For example the part type with a problem may be established in response to a dealer receiving a warranty claim from a customer associated with a particular part. The warranty claim will include information associated with the part type. In this embodiment the dealer may receive the warranty claim by e-mail, fax, traditional mail, verbal communication, web-site interaction, or other method of communication. In addition, the part type with a problem may be established in response to a dealer or manufacturer receiving a repair report. In addition, a help desk may be used to establish a part problem. Field representatives working at the help desk may enter part problem data into a database such as a lotus notes database.

In a third control block 106, a problem level associated with the part type is determined. The problem level may be described as the accumulation of actual problems that occurred to the part. In one embodiment, the problem level may be associated with the problems that have occurred over a time period associated with the problem threshold. The identified problem level may be expressed in the same terms as the problem threshold, e.g., the part characteristic which may include a frequency, cost, and/or failure characteristic. For example, the part characteristic may include e.g., the number of part failures that have occurred, the rate of failure of the parts (or failure frequency), the operational hours before failure, the cost associated with the part (which may include labor cost, warranty cost etc.), the rate of cost associated with the part, the cost of the product associated with the part, cost per month, cost per failure, or cost per hour of operation. The problem level associated with a part type may be incremented in response to establishing a part with a problem, i.e., another warranty claim being received.

In a fourth control block 108 a comparison is performed between the identified problem level of a part type and the problem threshold associated with the part. For example, the accumulated actual problems are compared to the problem threshold. In one embodiment, if the problem level does not exceed the problem threshold, then the method may return to control block 106 to continue monitoring the part (e.g., monitoring for incoming part problems).

In a fifth control block 110, a production life of the part may be established. In one embodiment, the established production life may include a determination (which may be an estimate) of how much longer the part will be in production. If a part is within a threshold of being redesigned or withdrawn from use, then there may be no need to monitor the part. Therefore a production life threshold may be established based on the type of part. The threshold may be indicative of when it is of limited or no value to monitor a part because the part will be redesigned or withdrawn. The production life threshold may be expressed in terms of time. For example, if the production life threshold is six months, then if the current time is within six months of the end of the production life of a part, then there is no benefit to continue monitoring the part. The production life threshold may be determined on a part by part basis. Alternatively, a single production life threshold may be used for multiple types of parts.

In a sixth control block 112, a determination is made regarding whether the part is within a production life threshold of its production life. If the part is within a threshold of its part life, then control may be returned to control block 104 to continue monitoring for parts having problems. Otherwise, control may pass to control block 114.

In a seventh control block 114, a part type may be identified as a problem prone part in response to the comparison between the problem threshold and the problem level, and the production life determination. If the problem level exceeds the problem threshold, and the part is not within a production life threshold of its production life, then the part type may be identified as a part type with a problem, and appropriate action may be taken, as will be described below.

Figure 2:
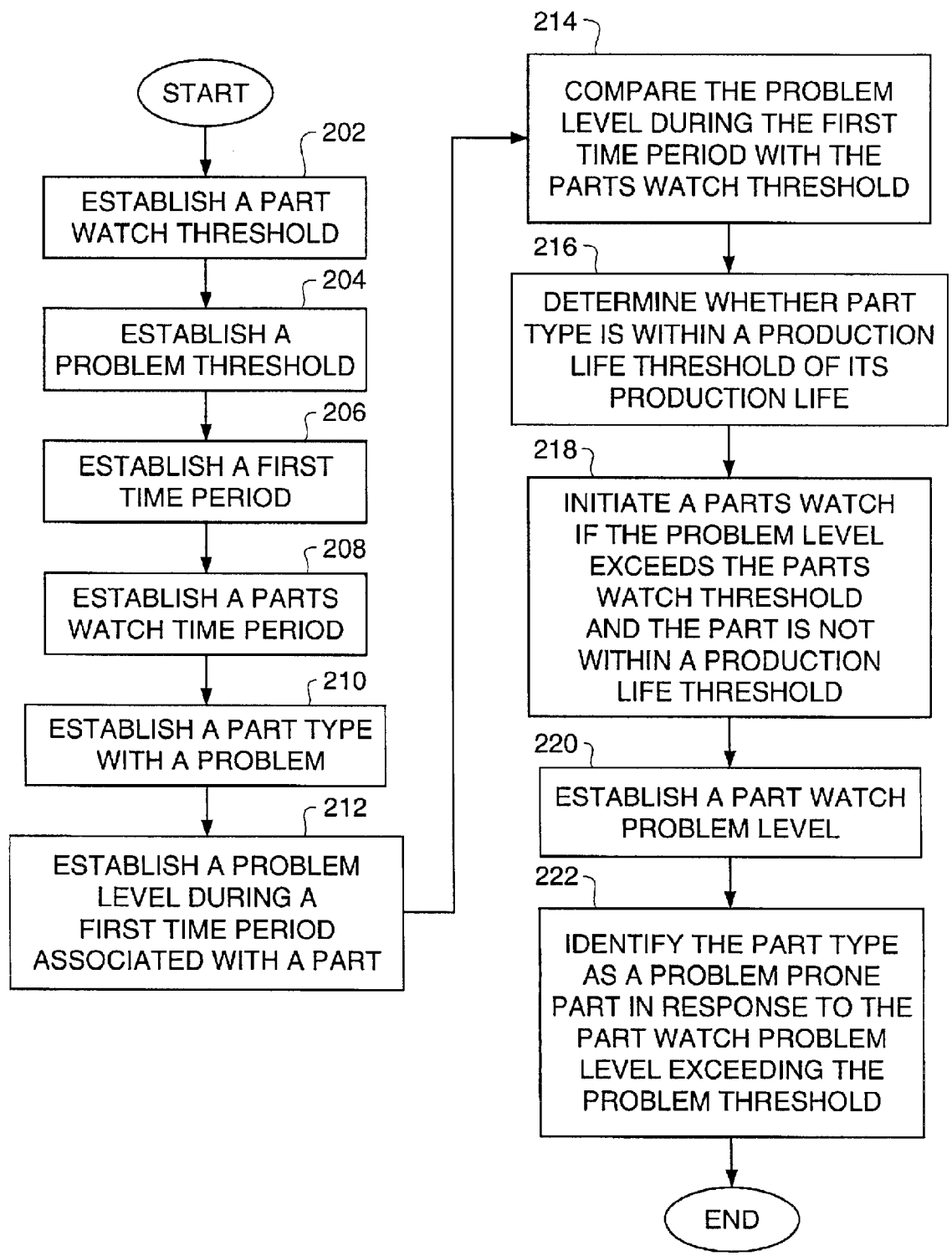
FIG. 2 is an illustration of another embodiment of a method of identifying a problem prone part.

FIG. 2 illustrates an alternative embodiment associated with the present invention. This embodiment monitors part problems in at least two phases. A first monitoring phase is used to determine when a part may having be a problem. If the problem level rises above a threshold, then a second monitoring phase, referred to as a part watch, is used to provide additional scrutiny to the part monitoring, to determine if it is a problem prone part. In a first control block 202 a part watch threshold may be established. A part watch is a process of monitoring a part type (e.g., the second monitoring phase) to determine if there is a problem such that corrective action should be taken. A part watch threshold is a threshold to determine when to transition from the first monitoring phase to the second monitoring phase associated with the part. The part watch threshold may be established in response to similar criteria as described for the problem threshold above (control block 102 of FIG. 1), e.g., in response to one or more part characteristics, such as cost characteristics failure characteristics, or frequency characteristics.

In a second control block 204 a problem threshold may be established. The problem threshold is a threshold used during the part watch (i.e., the second monitoring phase), that is indicative of when the problem should be classified as a problem prone part. The problem threshold may be expressed in terms of a part characteristic, as expressed above.

In a third control block 206, a first time period is established. The first time period is a time period during which part problems are accumulated and compared to the part watch threshold to determine if a part watch should be initiated. The time period may be a fixed time period (e.g., from January 1 through December 31), or it may be a variable time period (e.g., over the last six months).

In a fourth control block 208, a parts watch time period may be established. The parts watch time period is a time period during which part problems are accumulated and compared to the problem threshold to determine if the part is a problem prone part. In one embodiment, a part watch may be established for a fixed amount of time, e.g., for the next six months. Alternatively, the time period may be dependent on the number of problems received during the next six months. For example, if there aren't many problems early in the time period, but a lot later in the time period, the time period may be expanded for continued monitoring.

In a fifth control block 210 a part type with a problem may be established. A part type with a problem may be established in response to a dealer claim, warranty claim, service report or other claim or report. For example the part type with a problem may be established in response to a dealer receiving a warranty claim from a customer associated with a particular part. The warranty claim will include information associated with the part type. In this embodiment the dealer may receive the warranty claim by e-mail, fax, traditional mail, verbal communication, web-site interaction, or other method of communication. In addition, the part type with a problem may be established in response to a dealer or manufacturer receiving a repair report. In addition, a help desk may be used to establish a part problem. Field representatives working at the help desk may enter part problem data into a database such as a lotus notes database In a sixth control block 212 a problem level during the first time period associated with a part may be established. The problem level, e.g., actual problems, may be expressed in the same terms as the problem threshold or the part watch threshold. Each time a new problem occurs; the problem level may be updated. Alternatively, the problem level may be updated periodically, e.g. once a month etc. For example, the part type with a problem may be established in response to a dealer claim, warranty claim, service claim or other claim or report. As will be described below, in one embodiment, there may be instances where a part failure is not counted towards the problem threshold.

In a seventh control box 214, once a problem level with a part is established (e.g., a warranty claim is received), the problem level during the first time period may be compared with the parts watch threshold. If the problem level does not exceed the parts watch threshold, then control is passed to the sixth control block 212 to monitor for another part with a problem. If the problem level exceeds the parts watch threshold, then control is passed to an eighth control block 216.

In the eighth control block 216, if the problem level exceeds the parts watch threshold, a determination will be made regarding whether the part type is within a production life threshold of its production life. That is, a production life of the part may be established. In one embodiment, the established production life includes a determination (which may be an estimate) of how much longer the part will be in production. If there is only a month left in the production life of the part a problem part may not be corrected. If the production life of the part has years left a problem part may be corrected since there is still time remaining in the production life that would make it financial feasible to correct the problem part. In one embodiment, this step may be performed earlier in the process to ignore any problems with a part type within a time range of its production life or problem rate.

If the part is within a production life threshold of its production life, then control may return to the fifth control block to continue monitoring part problems.

In a ninth control block 218, if the problem level exceeds the parts watch threshold and the part is not within a production life threshold of its production life, then a parts watch is initiated. Once a parts watch is initiated, the problems that occur with the part during the part watch time period are monitored. In one embodiment, the problems with the part that occurred prior to the part watch may also be accounted for.

In a tenth control block 220 a part watch problem level may be established based on the number of problems that have occurred with the part during the part watch. The part watch problem level may be compared with the problem threshold.

In an eleventh control block 222, if the part watch problem level during the part watch time period exceeds the problem threshold, then the part may be identified as a problem prone part. If the parts watch problem level does not exceed the problem threshold, then the part watch problem level may continue to be monitored, e.g., control may be returned to control block 210.

In one embodiment, if the part watch problem level does not exceed the problem threshold, a determination may be made regarding whether to cancel the parts watch. For example, if the time since the initiation of the parts watch exceeds that part watch time period, and the part watch problem level is less then the part watch threshold, then the part watch may be cancelled, and control returns to the control block 210 to continue monitoring for part problems. In one embodiment, the problem level may be reset upon canceling the part watch.

In one embodiment, when a part problem is identified (e.g., during control block 210), a determination may be made regarding whether the part associated with a problem is within a threshold of its predicted or planned life. If the part is within a threshold of its predicted life, then the problem level is not incremented. For example, if a bolt is expected to last seven years, and it fails within one month of its seventh year, then the problem level would not be incremented. The purpose being that the problem may simply be due to the natural life of the part and the manner in which the part is used. A part redesign, for example, may not be desired when one or more of the problem parts are within a threshold of their useful life. Therefore, at one of several points in the process, a determination may be made as to whether the part is within a range of its part life. If it is, then the part may not be counted as a problem, and the process may continue to monitor for a part problem.

In one embodiment, the parts watch threshold, may dynamically vary in response to where a part is in its life cycle. For example, early on in the life cycle of a part, the parts watch threshold may be low, such that any problems in the part may be quickly identified and responded to. However, as the part nears the end of its life cycle (e.g., will either be redesigned or no longer produced), then the parts watch threshold may be increased, indicating that it would take a larger number of problems to occur before it was worth while to redesign the part, or correct the problem.

In one embodiment, the parts watch will include parts which have previously been identified as problem prone parts, but been allegedly repaired. In one embodiment, when a parts watch is initiated, the part watch threshold may be set to zero to indicate that the part has previously been identified as a problem prone part. This will alert a person to ineffective or incomplete solution that requires additional resolution.

Figure 3:
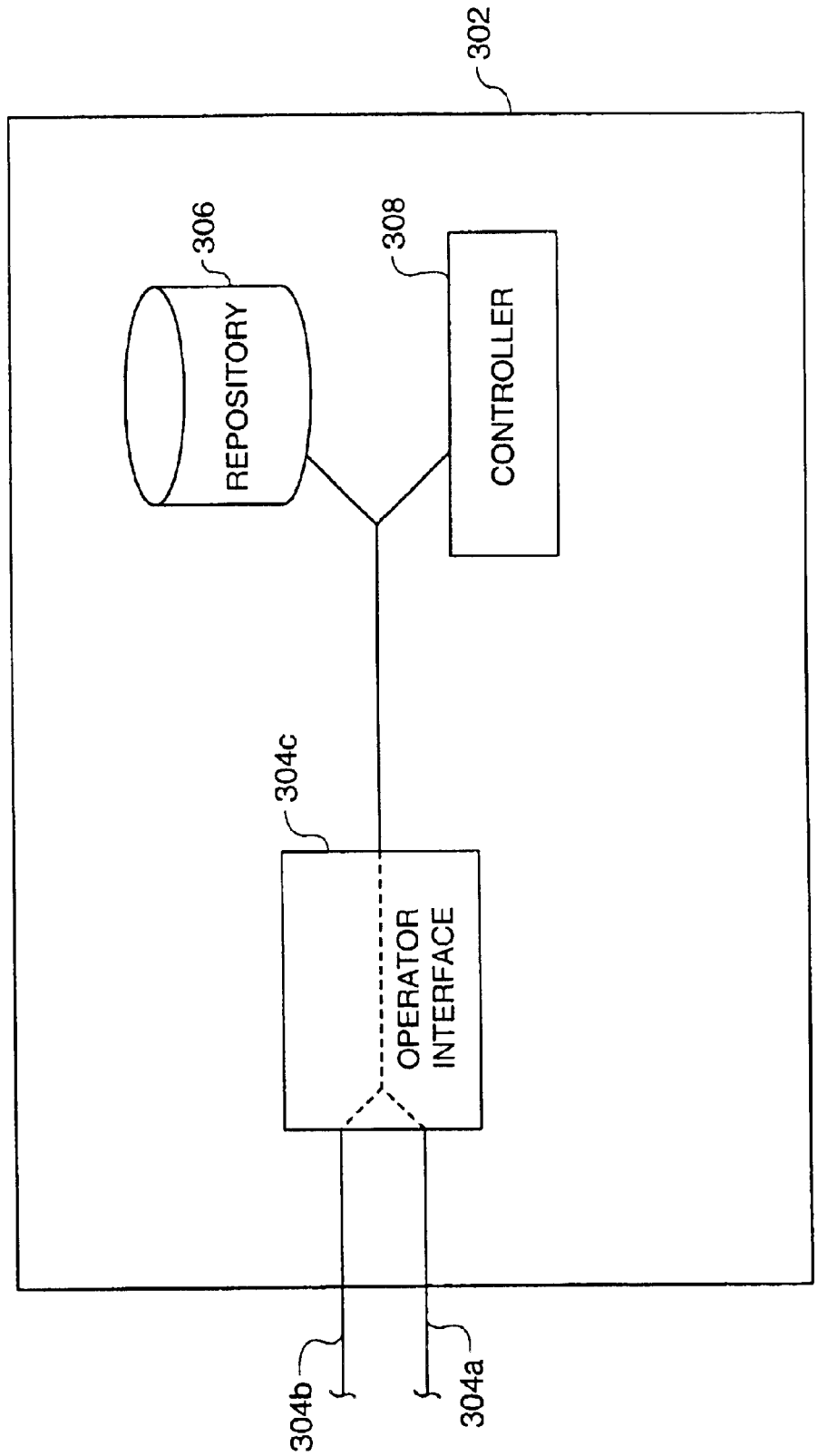
FIG. 3 is an illustration one embodiment of an system configured to identify a problem prone part.

In one embodiment, a problem characteristic of the part type may be identified. In one embodiment, the problem parts may be compared with each other or a good part, or the design, to establish the type of failure. If a common failure is established among multiple parts, then an analysis of the failure in light of the problem parts may be performed to establish a characteristic of the cause of the failure. In one embodiment, the failure characteristics may include a design characteristic or a production characteristic. The date the problem parts were made may be compared with each other to determine if they were made during the same time period, which would indicate a problem with the production process during that time period. For example, if multiple parts experienced a similar failure, further analysis may be performed (if it has not already) to determine if there is also a common production characteristic among the parts experiencing the similar failure, i.e., were the problem parts having similar failures produced within a time range of each other. If the parts were produced within a time period of each other then a production issue associated with the parts may be established. For example, one or more characteristics of the production environment may be identified as causing the failure. These characteristic(s) may then be addressed to reduce future failures. For example, perhaps poor grade steel was used in making the bolts during a particular production run. Then steps could be taken to ensure the proper quality was provided. Perhaps there was employee turnover on one or more points on an assembly line. Then steps may be taken to ensure that future "new" employees have improved training to reduce the learning curve and help maintain the desired part quality FIG. 3 illustrates one embodiment of a system 302 configured to identify a problem prone part. The system includes an interface 304 configured to receive information associated with a part type, a repository 306 configured to store said part type information, and a controller 308 configured to establish a problem with a part in response to the information, establish a problem threshold, determine a problem level with the part type over a time period, compare the problem level with the problem threshold, and identify a problem prone part in response to the comparison. In one embodiment, the processor is able to implement the methods described in FIG. 1 and/or FIG. 2.

In one embodiment, an interface 304 is used to receive information associated with one or more part type. The part type information may include information associated with a problem of one or more parts. For example, the information may include a dealer claim, a warranty claim, a service report, or other claim or report. The interface 304 may include a computer network 304a, a telephone line 304b, and/or an operator interface 304c (e.g., monitor and keyboard, hand held device etc.). In one embodiment, information associated with the part type, e.g., a warranty claim may be electronically delivered to the system 302. For example, an e-mail may be delivered to the system via the computer network, or via the telephone line. The e-mail may be received and reviewed by an operator via an operator interface 306, and the relevant information stored by the operator (either manually or automatically) in the repository. Alternatively the relevant information associated with the e-mail may be automatically stored in the repository upon arrival. In one embodiment, an operator using the operator interface may manually enter information associated with the part into the system.

Once information associated with a part has been received, the information may be stored in a repository 306. The information may be stored directly into the repository, or stored via the controller 308. The repository may include warranty claims, dealer claims and/or reports, and/or service information including reports and claims. Alternatively the part information may be stored in a separate repository (not shown) and accessed via the interface 304 (e.g., via the computer network 304b) to acquire (e.g., receive) the desired information associated with the part and/or part type.

The controller 308 is configured to establish a problem with a part in response to the received information. In one embodiment, the controller 308 is notified when information associated with one of more parts is received. The controller 308 may then establish a problem with a part. Alternatively, whether the controller 308 was notified or not, the controller 308 may execute a review of information associated in the repository. For example, there may be information associated with one or more warranty claims that have been received during a time period. The controller 308 may review the information associated with a problem part (e.g., warranty claims etc.) on a periodic basis to establish a problem level.

In one embodiment, a problem level is incremented in response to the received information. For example, if four warranty claims were received associated with a particular part in a month, then the problem level for the month would be four per month. Alternatively each time a problem was identified the problems/month could be updated.

In one embodiment, the controller establishes a problem threshold, establishes a part type with a problem, determines a problem level with the part type, compares the problem level with the problem threshold, establishes a production life of the part type, determines whether the part type is within a threshold of the production life, and identifies the part type as the problem prone part in response to the comparison and production life determination.

In one embodiment, production and/or design information associated with the part may be stored in the repository 306. Alternatively, an additional repository (not shown) may be accessed by the controller 308 (or system 302 in general) to access information associated with production characteristics or design characteristics of the part, or part-type in general.

Figure 4:
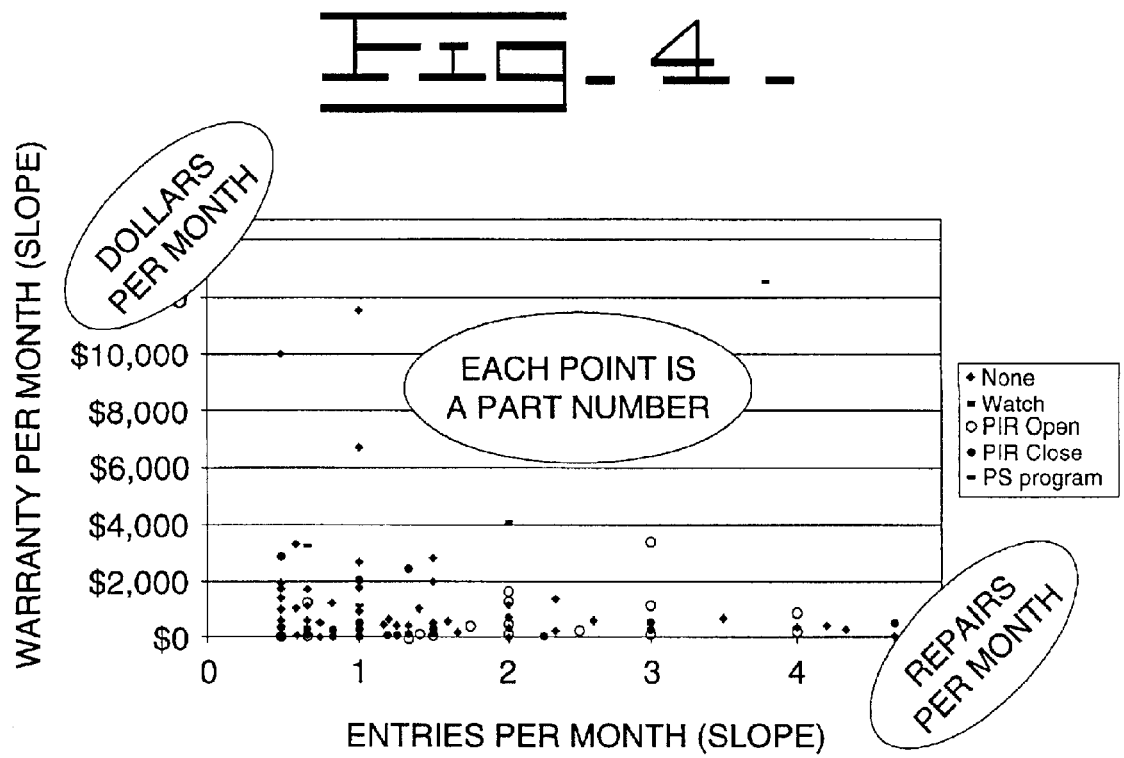
FIG. 4 is an illustration one embodiment of the plot of average reports per time period versus average warranty for time period.
Figure 5:
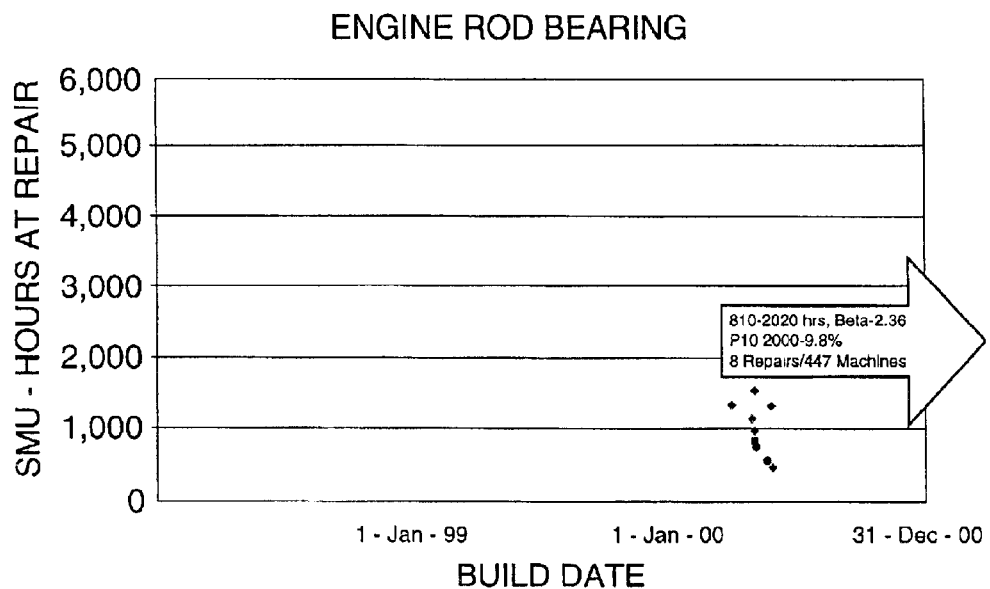
FIG. 5 is an illustration one embodiment of the number of reports made based on build date.

In one embodiment, analysis of the problem reports may be performed to identify the problem prone parts. FIGS. 4, 5 and 6 illustrate graphical representations of such analysis. These plots provide a way to visually (and quickly) analyze the status of a part, and establish a part as a problem prone part if necessary.

FIG. 4 illustrates the analysis of the plot of average reports per time period versus average warranty for time period. This plot can be done for an individual part type made in multiple facilities, a family of part types made in multiple facilities, a part type made in a specific plant, or a family of part types made in a specific plant. This plot facilitates the quick identification of the problems with parts, that status of the parts (e.g., does a part watch exist), and whether redesigns are currently in process.

FIG. 5 illustrates the analysis of the plot of build date verses hours on the machine for each failure. This plot helps facilitate a visual determination of whether the problem associated with a problem prone part is a production issue.

FIG. 6 illustrates the analysis of the plot cumulative failures over time combined with the monthly failure rate slope each month. FIG. 6 can be used to see if the problem is seasonal or sporadic.

Industrial Applicability

The present invention includes a method and system of identifying problem prone parts. In one embodiment the method and system are configured to identify parts that have been failing at a consistent rate from the start of production or a new or emerging problem that has been introduced into production in a more recent production cycle. In one embodiment the method enables the identification of high frequency, failure, or high warranty parts soon after they are first reported to the manufacturer through the service provider. This method draws attention or awareness to parts that are starting to emerge as new problems in ongoing production.

In one embodiment, a dealer may be requested to repair a machine. As part of the repair, the dealer may identify and replace a failed part. A service report may be established which identifies the failed part, the nature of the failure, and the machine the part was located on. The service report may be, or include, a warranty claim/report. The service report may be established electronically, e.g., entered into a computing system. The service report may then be delivered to a system configured to identify a problem prone part, as illustrated in FIG. 3.

In one embodiment, a help desk may be used to log problems into a database, such as a lotus notes database. A field representative may be asked any number of questions and the answers to the questions relating to part failure are entered into a computer terminal and stored in the database.

Then the system may electronically receive the service report generated by the dealer. The system may automatically identify the part at issue, and increment the problem level associated with the part. The production life of the part may also be established if it has not been already.

In one embodiment, the system may automatically analyze the problem level when a new part problem is established. For example, the system may compare the current problem level with a part watch threshold. The system may establish a parts watch in response to the problem level during the first time period exceeding the part watch threshold, and said part type being within the threshold of the production life. If a parts watch has already been established, then the system may automatically determine a problem level with the part type during the parts watch time period, and then identify the part type as a problem prone part in response to the parts watch problem level exceeding the problem threshold. As will be described, the system may then have the updated information available the next time a user accesses the system. Alternatively, the system may not analyze the problem level until the user specifically request an update, or request any information associated with the part.

The user may access the system 302, e.g., via the interface 304. In one embodiment, the system may provide information associated with one or more part types on the display. The system may do this automatically, or upon the specific request of the user. For example, the program may display a list of recent warranty claims. The user could select one or more of the claims from the list to review additional information associated with the claim. In addition, the user could select the part type associated with the claim, and receive a status of the part. The status could include the number of claims submitted on the part or whether a part watch has been initiated on the part type. If a part watch has been initiated, how many part watch problems have been identified, and how many remain before the part is identified as a problem part.

In one embodiment, a list of the part types under a part watch, a list of part types that have been placed on a parts watch since the user last accessed the program, or a list of parts that have been removed since the user last accessed the program may be displayed to the user.

In one embodiment, the problems may be prioritized to establish which ones to address first. Priority may be established by the average number of reports associated with a part received in a time period (typically months) and by the average warranty paid for each part number in a time period (typically months. The prioritization scheme may be incorporated into establishing the parts watch threshold and/or the problem threshold.

In another embodiment problems can be prioritized on the system level. For example, the problems on a piece of equipment may be prioritized. A tractor may be comprised of 100 different parts. The repair reports or warranty claims are received on the different part failures on the equipment. A prioritized list of the parts can then be compiled based on many factors. These factors may include, cost of the part, significance of the part to the operation of the equipment, difficulty of the part to replace, and cost of performing the repair with a new part. For example, a part may cost $10 but because of the location of the part, a significant portion of the tractor may require disassembly. The tractor may require 24 hours to disassemble and replace the part, causing the tractor to be unavailable for work for a 24 hours period, plus the cost of a repairman for 24 hours worth of repair work. So the $10 part may cost thousands of dollars. On the other hand, a $500 dollar part that is easily replaced and takes only an hour to replace may cost $600 total, including repairman time and tractor down time. By prioritizing parts on the system level the cost of a problem part in relation to the affect the problem part has on the system, or tractor in this case, can be fully realized. This results in understanding the affect the problem part has on the tractor and better realization of the problem parts importance. As mentioned, this information may be used in establishing the problem threshold (i.e., when to identify a part as a problem prone part).

The problem threshold may vary from one part type to another. Therefore, the problem threshold (e.g. acceptable number of failures, failure rate, or cost) may be established based upon a characteristic of the part. Part characteristics may include, cost characteristics of the part or frequency characteristics of the part. For example, frequency characteristics may include the number of parts developed (e.g., manufactured, assembled, or some other technique of forming a part). Therefore, the problem threshold may change dependant on the volume of products produced.

Cost characteristics of a part may include the cost of the part type associated with the part. For example, if 50 bolts are made in a year and 50 engines are made in a year, the problem thresholds may still be 10 and 1 respectively because it doesn't cost that much to replace 10 bolts, but may be extremely costly to replace 10 engines. In addition, the problem threshold may be based on a cost characteristic of the product, assembly, or function associated with the part. For example, if there are two bolt types A and B. If part type A is needed on a $10 assembly, and part type B is critical on a $2,000,000 machine, then the problem threshold for part type B may be higher due to the assembly it will be used on.

In one embodiment analysis associated with the part may be graphed, as illustrated in FIG. 4, FIG. 5 and FIG. 6. FIG. 4 shows the plot of average reports per time period versus average warranty for time period. This plot can be done for an individual part type made in multiple facilities, a family of part types made in multiple facilities, a part type made in a specific plant, or a family of part types made in a specific plant. Each plotted point is indicative of a part receiving reports or warranty paid in a time period. Average frequency of reports is plotted on one axis. Average warranty of reports is plotted on the other axis. Parts with higher frequency or higher warranty are candidates for problem investigation. To help facilitate review of this plot, problems that are known and are in the process of developing a fix or have had a production fix may be designated by a particular color or symbol. Problems that are currently under investigation to determine if they are truly a problem may be designated with a different color or symbol. Problems under investigation are described as part watch items. FIG. 4 shows a plot of average number of reports as described above plotted over reporting periods. This plot is made for individual part or problems. This plot indicates when customers or dealers time first reported the part. Additionally, the cumulative number of reports is plotted on this chart. This chart could also be plotted for the average warranty dollars paid over time. This chart can also be used to identify problems that are reported on a seasonal basis In one embodiment the part type problems may be graphed. For example, FIG. 5 illustrates a problem level, expressed in hours of use at the time of failure, plotted relative to the build date for a particular part type. This graph will provide a user a visual representation of the problem level. That is, if the hours at repair begin to drop, indicating parts failing earlier in their life, then this will be visually evident from the graph. In addition to plotting this information, the controller, may analyze the date and compare the failure rate, to the problem threshold (e.g. acceptable failure rate), and determine if the problem is a problem prone part. In addition the rate of change in the failure rate may be compared to an acceptable rate of change (problem threshold). If the rate of change exceeds the acceptable threshold, the part may be identified as a problem prone part. In one embodiment if the problem threshold is exceeded, then a life expectancy of the part type may be calculated. For example a B10 calculation may be performed. B10 is an expression indicative of when 10% of the parts of part type will fail. The B10 calculation may be compared to an acceptable B10 parameter (e.g. problem threshold). If the projected B10 parameter is less than the acceptable B10 parameter (i.e. the parts are projected to fail earlier than desired), than the part type may be identified as a problem prone part.

FIG. 6 shows plot cumulative failures over time combined with the monthly failure rate slope each month. FIG. 6 can be used to see if the problem is seasonal or sporadic.

In one embodiment, the problems may be tracked on a part or system level basis based on the rate or frequency of the problems. What failures occur most frequently on either a part or a system is tracked.

Based on the analysis of the part, (e.g., the established problem levels etc.)the part may be identified as a problem prone part, prompting further analysis to be performed, such as a redesign of the part.

Other aspects, objects, and advantages of the present invention can be obtained from a study of the drawings, the disclosure, and the claims.

What is claimed is:

1. A method of identifying a problem prone part type comprising the steps of:
   establishing a problem threshold;
   establishing a part type with a problem;
   determining a problem level with said part type in response to said part type problem;
   comparing said problem level with said problem threshold;
   establishing a production life of said part type, said production life including an indication of how much longer the part will be in production;
   determining if said part type is within a threshold of said production life;
   identifying said part type as said problem prone part in response to said comparison and said production life determination.

2. A method as set forth in claim 1, further comprising the step of establishing a part watch trigger.

3. A method as set forth in claim 2, wherein the step of establishing a part watch trigger further comprises the step of establishing said part watch trigger in response to a part type characteristic, and a part type volume.

4. A method, as set forth in claim 3, wherein said part type characteristic includes at least one of a problem frequency threshold and a part type cost characteristic.

5. A method as set forth in claim 2, further comprising the steps of:
   establishing a parts watch trigger time period; and
   determining said problem level during said trigger time period.

6. The method as set forth in claim 5, further comprising the step of establishing a parts watch in response to said problem level during said trigger time period exceeding said parts watch trigger.

7. The method as set forth in claim 6, further comprising the steps of:
   establishing a part watch time period;
   establishing a part watch time, said part watch time beginning in response to the establishment of said parts watch;
   determining a problem level occurring during said part watch time period; and
   concluding said part watch in response to said part watch time exceeding said part watch time period and said problem level occuring during said part watch time period being less than said problem threshold.

8. A method, as set forth in claim 6, further comprising the steps of:
   establishing a part watch time period;
   establishing a part watch time, said part watch time beginning in response to the establishment of said parts watch;
   determining a problem level occurring during said part watch time period; and
   concluding said part watch in response to said parts watch time exceeding said part watch time period before said number of part type problems exceeds said problem threshold.

9. A method, as set forth in claim 6, wherein the step of identifying said part type as said problem prone part further comprises the steps of:
   establishing a part watch time period;
   establishing a part watch time, said part watch time beginning in response to the establishment of said parts watch;
   determining a problem level occurring during said part watch time period; and
   identifying said part type as said problem prone part in response to said part watch time being less than said part watch time period and said number of part type problems exceeding said problem threshold.

10. The method as set forth in claim 1, further comprising the step of establishing a part failure in response to one of a dealer receiving a warranty claim and a dealer receiving a repair report.

11. The method as set forth in claim 1, further comprising the step of establishing said problem threshold based on a cost characteristic of said part type.

12. The method as set forth in claim 1, further comprising the step of establishing a database, said database including at least one of a problem associated with said part, and a time characteristic of said part.

13. The method as set forth in claim 12, further comprising the step of entering said part problem into a database by at least one of a user, and a dealer and a manufacturer of said part.

14. The method as set forth in claim 1, further comprising the step of correlating a production period associated with said problem part.

15. The method as set forth in claim 14, further comprising the step of identifying a production issue of said production period associated with said part.

16. The method as set forth in claim 1, further comprising the steps of:
   comparing a part life with an age of a problem part; and
   incrementing said problem level in response to said problem part age being less than an age threshold.

17. A system configured to identify a problem prone part, comprising:
   an interface configured to receive information associated with a part type;

a repository configured to store said part type information; and a controller configured to establish a problem with a part in response to said information, compare a predicted part life with an age of said part, increment a problem level associated with said part type in response to said part age being less than said predicted part life, compare said incremented problem level with a problem threshold associated with said part type, and identify said part type as a problem prone part in response to the comparison.

18. A method as set forth in claim 17, further comprising the step of using an interface capable of receiving a wireless signal.

19. A method as set forth in claim 17, further comprising the step of using a web enabled graphical user interface to allow said part type information to be entered into said system.

20. A method, of identifying a problem prone part type comprising the steps of:

establishing a parts watch threshold;

establishing a problem threshold;

establishing a first time period;

establishing a part watch time period;

establishing a part type with a problem;

establishing a problem level with said part type during said first time period;

establishing a production life of said part type;

establishing if said part type is within a theshold of said production life;

establishing a parts watch in response to said problem level during said first time period exceeding said part watch threshold, and said part type being outside said threshold of said production life;

establish a parts watch problem level with said part type during said parts watch time period; and identifying said part type as said problem prone part in response to said parts watch problem level exceeding said problem threshold.

21. A method, as set forth in claim 20, further comprising the steps of:

establishing where a part is in a parts life cycle; and modifying one of said parts watch threshold and said problem threshold in response to said established location in said parts life cycle.

22. A method, as set forth in claim 1, wherein the step of establishing a problem threshold, further comprises the step of establishing said problem threshold in response to a volume of said part type.

23. A method, as set forth in claim 1, further comprising the step of modifying said problem threshold in response to a remaining production life of said part type.

* * * * *